(12) United States Patent
Cho et al.

(10) Patent No.: US 7,577,117 B2
(45) Date of Patent: Aug. 18, 2009

(54) WIRELESS TERMINALS SUPPORTING COMMUNICATIONS WITH AN ACCESS POINT OVER SEPARATE WIRELESS CHANNELS AND RELATED WIRELESS SYSTEMS

(75) Inventors: Hyunwoo Cho, Kyungki-do (KR); Kicheol Lee, Kyungki-do (KR)

(73) Assignee: Samsung Electronics Co., Ltd. (KR)

( * ) Notice: Subject to any disclaimer, the term of this patent is extended or adjusted under 35 U.S.C. 154(b) by 878 days.

(21) Appl. No.: 10/806,903

(22) Filed: Mar. 23, 2004

(65) Prior Publication Data
US 2004/0213180 A1 Oct. 28, 2004

(30) Foreign Application Priority Data
Apr. 25, 2003 (KR) ............ 10-2003-0026484

(51) Int. Cl.
H04M 1/00 (2006.01)
H04W 4/00 (2006.01)
(52) U.S. Cl. .............. 370/329; 455/553.1; 370/338
(58) Field of Classification Search ............. None
See application file for complete search history.

(56) References Cited

U.S. PATENT DOCUMENTS

| | | | |
|---|---|---|---|
| 5,790,800 A | 8/1998 | Gauvin et al. | |
| 5,960,344 A | 9/1999 | Mahany | 455/432 |
| 6,115,615 A * | 9/2000 | Ota et al. | 455/422.1 |
| 6,285,886 B1 * | 9/2001 | Kamel et al. | 455/522 |
| 6,480,480 B1 * | 11/2002 | Du | 370/338 |
| 7,274,652 B1 * | 9/2007 | Webster et al. | 370/204 |
| 2001/0013062 A1 | 8/2001 | Ono | |
| 2002/0006120 A1 * | 1/2002 | Suzuki et al. | 370/329 |
| 2002/0006812 A1 | 1/2002 | Saadeh et al. | |
| 2002/0025810 A1 * | 2/2002 | Takayama et al. | 455/432 |
| 2002/0062472 A1 * | 5/2002 | Medlock et al. | 716/1 |
| 2002/0173277 A1 * | 11/2002 | Takao et al. | 455/77 |
| 2003/0035398 A1 | 2/2003 | Sato | |
| 2004/0013128 A1 | 1/2004 | Moreton et al. | 370/447 |
| 2004/0073361 A1 * | 4/2004 | Tzamaloukas et al. | 701/210 |
| 2004/0160929 A1 | 8/2004 | Shpak | 370/338 |

FOREIGN PATENT DOCUMENTS

EP 1 195 949 A2 10/2001

(Continued)

OTHER PUBLICATIONS

British Search Report and Examination Report for British patent application No. GB0408679.9 mailed on May 12, 2005.

(Continued)

Primary Examiner—Lester Kincaid
Assistant Examiner—Joel Ajayi
(74) Attorney, Agent, or Firm—Myers Bigel Sibley & Sajovec

(57) ABSTRACT

Wireless terminals that are configured to communicate over a wireless local area network include a data processor and at least one MAC control unit that is responsive to the data processor that controls communications with an access point over first and second communications channels. The wireless terminals may further include a first interface between the at least one MAC control unit and the first communications channel and a second interface between the at least one MAC control unit and the second communications channel.

34 Claims, 14 Drawing Sheets

FOREIGN PATENT DOCUMENTS

| | | |
|---|---|---|
| EP | 0 930 766 A3 | 6/2004 |
| GB | 2 349 551 A | 11/2000 |
| WO | WO 02/073831 | 9/2002 |

OTHER PUBLICATIONS

Notice to File a Response/Amendment to the Examination Report for Korean patent application No. 10-2003-0026484 mailed on May 26, 2005.

United Kingdom Combined Search and Examination Report for corresponding United Kingdom application GB0408679.9 dated Oct. 8, 2004.

Search Report for corresponding United Kingdom Patent Application No. 0701650.4 dated Mar. 22, 2007.

Search Report for corresponding United Kingdom Patent Application No. 0701650.4 dated Mar. 22, 2007.

\* cited by examiner

WIRELESS TERMINALS SUPPORTING COMMUNICATIONS WITH AN ACCESS POINT OVER SEPARATE WIRELESS CHANNELS AND RELATED WIRELESS SYSTEMS

CROSS REFERENCE TO RELATED APPLICATIONS

This application claims priority under 35 U.S.C. § 119 to Korean Patent Application No. 2003-26484, filed Apr. 25, 2003, the contents of which are incorporated herein in its entirety by reference.

FIELD OF THE INVENTION

The present invention relates to wireless communications terminals, and more particularly, to wireless communications terminals that support communications over separate wireless channels.

BACKGROUND OF THE INVENTION

A wireless LAN (local area network) system is one example of a general wireless communication system. FIG. 1 is a schematic diagram illustrating an exemplary wireless LAN system that is suggested in IEEE 802.11.

As shown in FIG. 1, the wireless LAN system has, as a basic unit, a basic service set (BSS) 100. BSS 100 includes at least one wireless terminal or "station" 104 and an access point (AP) 102. Two basic service sets (BSS-A, BSS-B) are depicted in FIG. 1. As shown in FIG. 1, the two basic service sets BSS-A and BSS-B may be connected with each other through a distribution system (DS) 110. BSS-A and/or BSS-B may also be connected with the Internet or with other external processing servers through a wire network or a wireless network.

The above-described wireless LAN system may communicate in a 5 GHz band using orthogonal frequency division multiplexing (OFDM) as suggested as a standard in version "a" of the IEEE 802.11 standard (i.e., IEEE 802.11a). Alternatively, the wireless LAN system may communicate in a 2.4 GHz band using direct sequence spread spectrum (DSSS) as suggested as a standard in version "b" of the IEEE 802.11 (i.e., IEEE 802.11b).

As will be understood by persons of skill in the art, orthogonal frequency division multiplexing (OFDM) refers to multi carrier digital wave modulation multiple access technique that may support hundreds of carriers. OFDM may provide for increased transmission rates per unit bandwidth and may reduce or prevent multi-route interference. Each of the carriers is designed to have an orthogonal relationship to each of the other carriers. Since the orthogonal frequency division multiplexing (OFDM) can multiplex more carriers per unit bandwidth than can be multiplexed using a general frequency division multiplexing technique, OFDM systems can provide for increased transmission rates per unit bandwidth.

Direct sequence spread spectrum (DSSS) refers to a method in which pseudo-random noise sequences that are orthogonal with one another are added to an origin signal within a predetermined frequency bandwidth for transmission and reception. The transmitter and receiver share the pseudo-random noise sequences such that data transmission and reception for a plurality of users can be made over a single channel.

Wireless LAN systems may be configured to support both the orthogonal frequency division multiplexing technique of IEEE 802.11a and the direct sequence spread spectrum technique of IEEE 802.11b. To facilitate this, a network interface card for the physical interface to the wireless LAN has been developed that supports dual mode IEEE 802.11a/b or tri-mode IEEE 802.11a/b/g.

FIG. 2 is a block diagram depicting a conventional wireless communication system for transmitting and receiving data between one of the wireless terminals and an access point in the wireless LAN system of FIG. 1. As shown in FIG. 2, the wireless communication system transmits and receives data using a single wireless channel 206 between the access point 202 and the wireless terminal 204.

FIG. 3 is a block diagram of the access point 202 and the wireless terminal 204 in the wireless communication system of FIG. 2. As described previously, the access point 202 is a device that is used to interface the wireless terminals to an external communication network such as, for example, the Internet, a satellite broadcasting network or a cable network. Thus, the access point 202 allows the user of the wireless terminal 204 to access services provided on an external network such as the Internet or games. Further, in a special case, the access point 202 can use data stored within the access point 202 to provide one or more services to users without interfacing with an external network. This is called an ad-hoc mode in the wireless LAN. In the ad hoc mode, the access point 202 not only interfaces the wireless terminal 204 to an external service network, but it also can construct a data service network in itself.

FIG. 4 is a flowchart illustrating a procedure for data transmission and reception between the access point 202 and the wireless terminal 204 of FIG. 3. In the example of FIG. 4, the data flow illustrated is the date flow associated with a user that is watching a bi-directional high definition television set (HD-TV) while sending an e-mail through the Internet by using the access point 202 and the wireless terminal 204. As shown in FIG. 4, the access point 202 transmits broadcasting data 401 from a broadcasting server (not shown in FIG. 4) to the wireless terminal 204. The wireless terminal 204 may also transmit response signals (ACK) to the broadcasting data 401 and/or broadcasting control signals (volume, channel, etc.) to the access point 202. The wireless terminal 204 also transmits mail data 412 that is generated by the user of the wireless terminal 204 to a mail server (not shown in FIG. 4) through the access point 202. A response signal to the mail data 412 may also be transmitted from the access point 202 to the wireless terminal 204.

In the example of FIG. 4, the data processor 318 resident at the wireless terminal 204 (see FIG. 3) may perform multiple different applications simultaneously such as transmission of the mail data 412 and display of the HD-TV signal 411 using the broadcasting data 401 received from the access point 202. The data processor 318 also performs protocols 413 and 414 for execution and transmission of the corresponding applications 411 and 412. The protocols performed in the wireless LAN system are exemplified as a resource reservation protocol (RSVP) for reserving/securing the band needed for the communication, and a transmission control protocol/Internet protocol (TCP/IP) for performing routing functions on the Internet.

The MAC control unit 314 on the wireless terminal 204 (see FIG. 3), through a wireless channel interface unit 312, checks the state of the wireless channel 206 for communication. If the wireless channel 206 is available, the interface unit 312 occupies the channel 206. Once the channel 206 is occupied, the wireless channel interface unit 312 transmits 417 data (e.g., mail, response signals, control signals, etc.) from the data processor 318 to the access point 202 over the wireless channel 206, and receives 418 data (broadcasting data, response signals, etc.) from the access point 202 and forwards this received data to the data processor 318 via the MAC control unit 314. For this data transmission and reception, the wireless channel interface unit 312 includes a transmitter for transmission and a receiver for reception.

In the example of FIG. 4, the data processor 302 resident at the access point 202 (see FIG. 3) likewise performs multiple different applications. In particular, the data processor 302 interfaces with external servers such as a broadcasting server and a mail server to transmit the broadcasting data 401 from the broadcasting server to the wireless terminal 204 and to forward mail data 402 from the wireless terminal 204 to the mail server. The data processor 302 also performs protocols 403 and 404 for execution and transmission of the corresponding applications 401 and 402, where protocol 403 is a resource reservation protocol and protocol 404 is a TCP/IP protocol.

The MAC control unit 306 of the access point 202, via the wireless channel interface unit 308, checks the state of the wireless channel 206 for communications and occupies the channel 206. Once the channel 206 is occupied, the wireless channel interface unit 308 transmits the broadcasting data 401 from the data processor 302 to the wireless terminal 204 over the wireless channel 206, or receives data 402 from the wireless terminal 204 and forwards the received data 402 to the data processor 302 via the MAC control unit 306. The wireless channel interface unit 308 of the access point 202 also includes a transmitter and a receiver for data transmission and reception.

When only a single wireless channel 206 is provided, a conventional wireless communication system cannot transmit data from the access point 202 to the wireless terminal 204 while simultaneously transmitting data from the wireless terminal 204 to the access point 202.

FIG. 5 depicts a frame of data that may be transmitted and received through the wireless channel 206 as part of the data flow illustrated in FIG. 4. As shown in FIG. 5, data that is transmitted and received for each of the applications is intermixed over one channel for transmission and reception.

SUMMARY OF THE INVENTION

Embodiments of the present invention provide wireless terminals that are configured to communicate over a wireless local area network. The wireless terminals may include a data processor and at least one control unit that is responsive to the data processor. The control unit may control communications between the wireless terminal and an access point over a first communications channel and a second, full-duplex, communications channel. The wireless terminal may further include a first interface between the control unit(s) and the first communications channel and a second interface between the control unit(s) and the second communications channel. The control units may comprise MAC control units.

The wireless terminal may also include a traffic control unit that is responsive to the data processor. The traffic control unit may be used to form the data transmission route for data associated with applications running on the wireless terminal. The MAC control unit(s) may be implemented as a first MAC control unit that controls communications with the access point over the first communications channel and a second MAC control unit that controls communications with the access point over the second communications channel. The traffic control unit may be implemented as part of one or more of the MAC control units.

In further embodiments of the present invention, the first communications channel is implemented as an orthogonal frequency division multiplexing channel and the second communications channel is implemented as a direct sequence spread spectrum communications channel. The first channel may be implemented as a uni-directional channel that only carries data from the access point to the wireless terminal or as a bi-directional communications channel. Data associated with a first application running on the wireless terminal may be transmitted to the wireless terminal over the first communications channel, and at least some of the control signals associated with the first application may transmitted from the wireless terminal to the access point over the second communications channel. The wireless local area network may operate, at least in part, under the IEEE 802.11 standard, and the first communications channel and the second communications channel may be implemented in different frequency bands.

Pursuant to further embodiments of the present invention, wireless communications systems are provided that include a wireless terminal that transmits and receives data associated with first and second applications that are running on the wireless terminal. The systems further include an access point that serves as an interface between the wireless terminal and one or more processing servers that are located on external network(s). Data associated with the first application may be transmitted between the wireless terminal and the access point over the first communications channel, and data associated with the second application may be transmitted between the wireless terminal and the access point over the second communications channel. The second communications channel may also be used to transmit control information associated with the first application.

Pursuant to additional embodiments of the present invention, methods for simultaneously supporting at least two applications on a wireless terminal are provided. Pursuant to these methods, data associated with a first application may be received at the wireless terminal over a first communications channel between the wireless terminal and the access point. A transmission path between the wireless terminal and the access point over a second communications channel may also be established for application data associated with a second application. The application data associated with the second application may then be transmitted over the second communications channel via the transmission path.

DETAILED DESCRIPTION OF THE INVENTION

Figure 1:
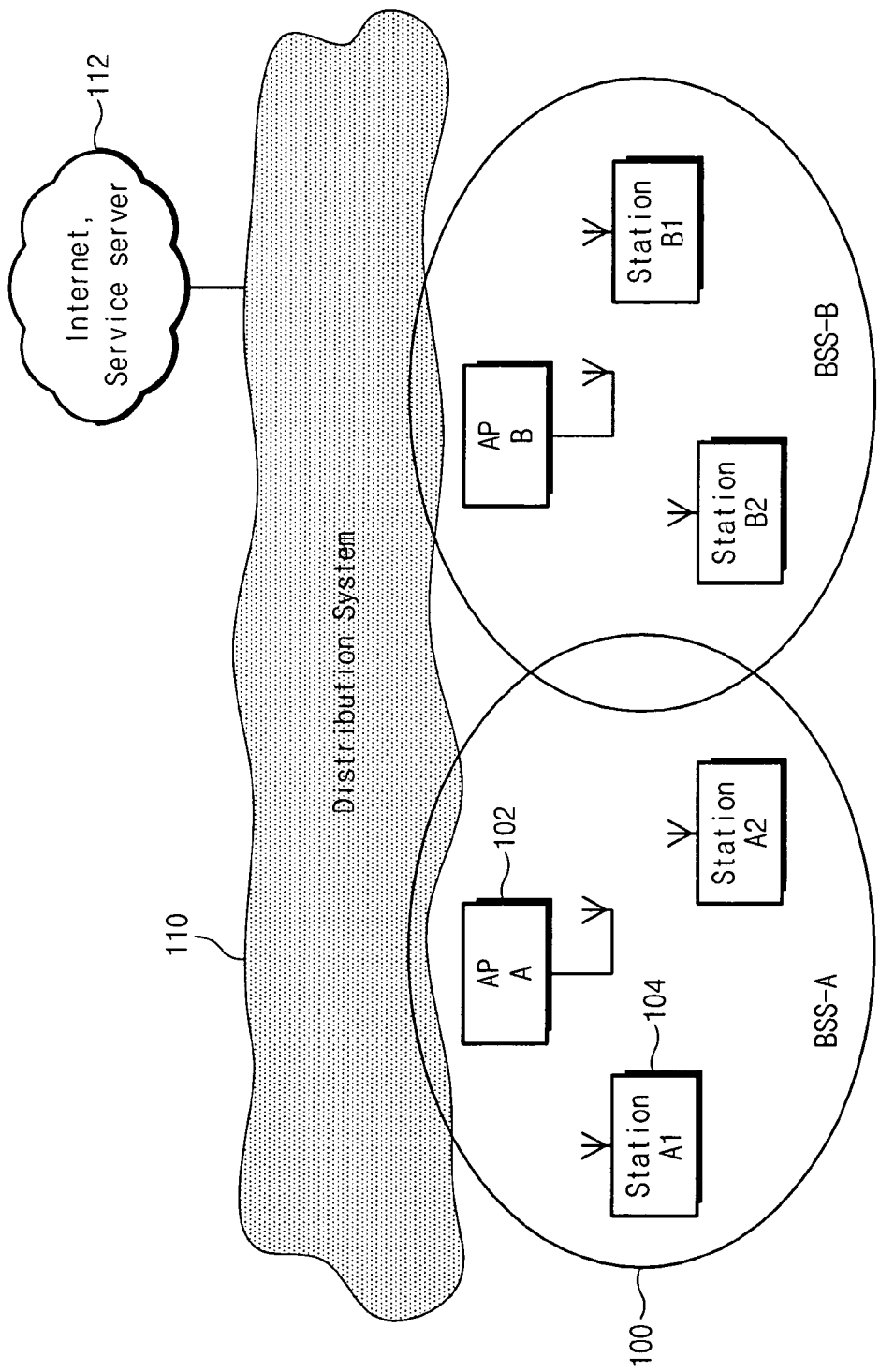
FIG. 1 is a schematic view illustrating an IEEE 802.11 wireless LAN system.
Figure 2:
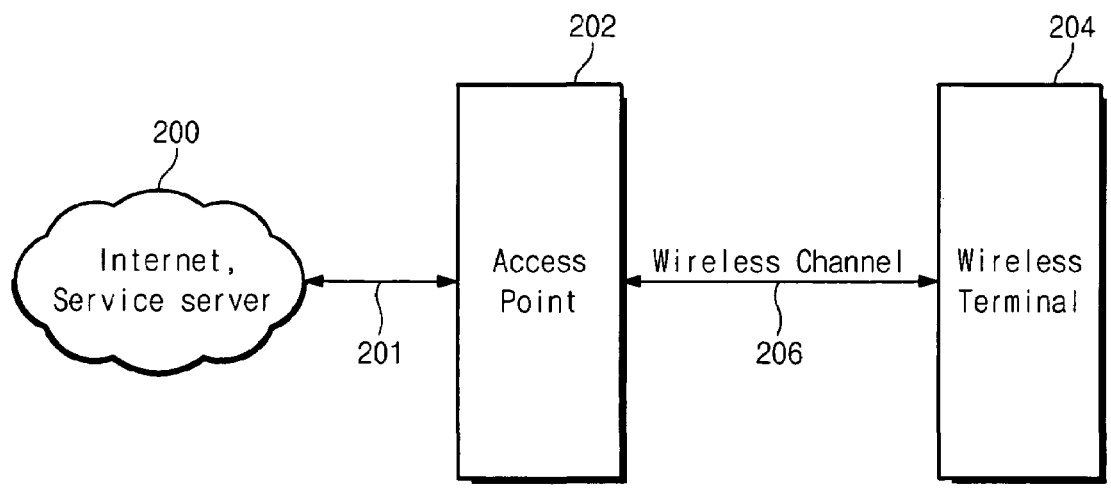
FIG. 2 is a block diagram depicting a conventional wireless communication system for transmitting and receiving data between a wireless terminal and an access point via a single wireless channel using the wireless LAN system of FIG. 1.
Figure 3:
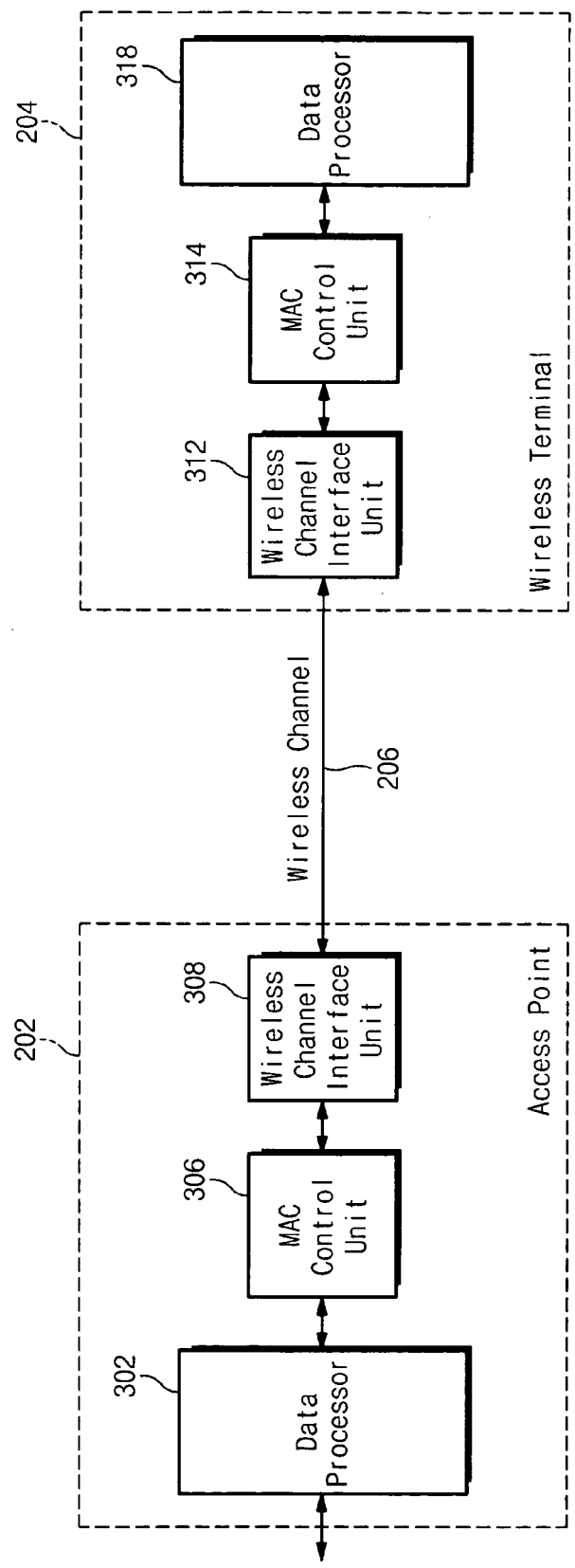
FIG. 3 is a block diagram of an access point and a wireless terminal in the wireless communication system of FIG. 2.
Figure 4:
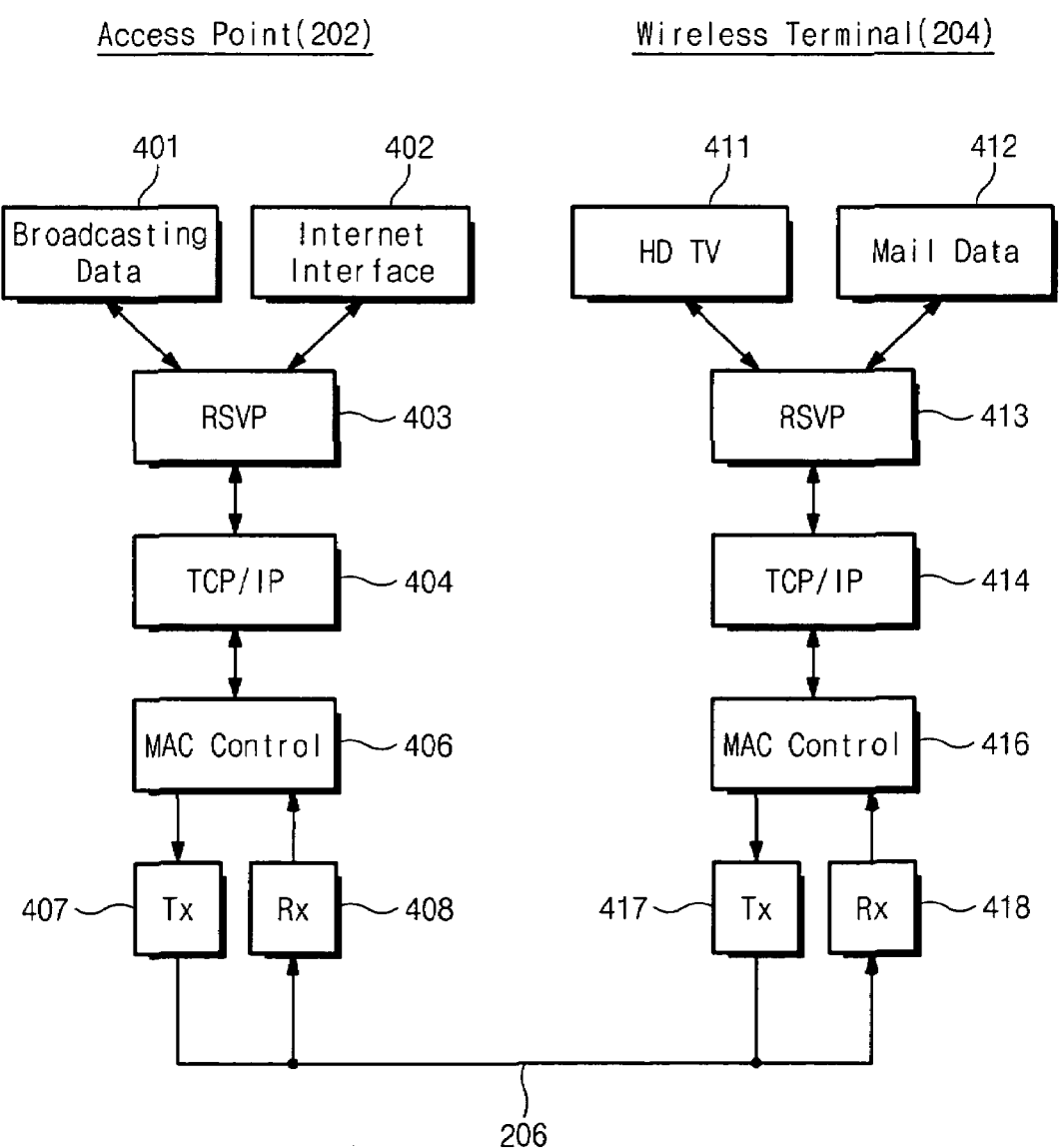
FIG. 4 is a flow chart illustrating a procedure for data transmission and reception between the access point and the wireless terminal of FIG. 3.
Figure 5:
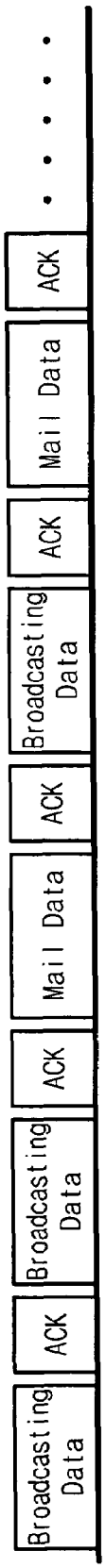
FIG. 5 depicts a frame of data that may be transmitted and received through a wireless channel as part of the data flow illustrated in FIG. 4.

The present invention will now be described more fully with reference to the accompanying drawings, in which embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

In embodiments the present invention, a plurality of separate wireless channels are used in one wireless communication system such that one channel group among the plurality of channels is used for a download channel and another channel group is used for an upload channel. Herein, "download" and "upload" are used to specify the direction in which data is transmitted, where the download channel refers to a channel that is used primarily with respect to data flow from the access point to the wireless terminal, and the upload channel refers to a channel that is used primarily with respect to data flow from the wireless terminal to the access point. As is made clear herein, the download channel may comprise a full duplex channel that, in addition to carrying data from the access point to the wireless terminal, may also carry other data or control signals such as, for example, control signals or responses associated with the data flow that are transmitted from the wireless terminal to the access point. Similarly, the upload channel may comprise a full duplex channel that, in addition to carrying data from the wireless terminal to the access point, may also carry other data or control signals such as, for example, control signals or responses associated with the data flow that are transmitted from the access point to the wireless terminal. Additionally, as discussed herein, in embodiments of the present invention, one of the upload channel or the download channel may comprise a half-duplex channel while the other comprises a full-duplex channel, and control signals and responses associated with the data carried on the half-duplex channel may be carried on the full-duplex channel.

Hereinafter, embodiments of the present invention are described in which the wireless communication systems have two wireless channels. It will be appreciated, however, that the methods and systems of the present invention may also be applied to wireless communication systems having more than two wireless channels. Additionally, it will also be understood that when a device or element is referred to as being "coupled" or "connected" to a second device or element, it can be directly coupled or connected to the second device or element or, alternatively, intervening devices, elements and/or connections may also be present. In contrast, when a device or element is referred to as being "directly connected" to a second device or element, there are no intervening devices, elements and/or connections present.

Figure 6:
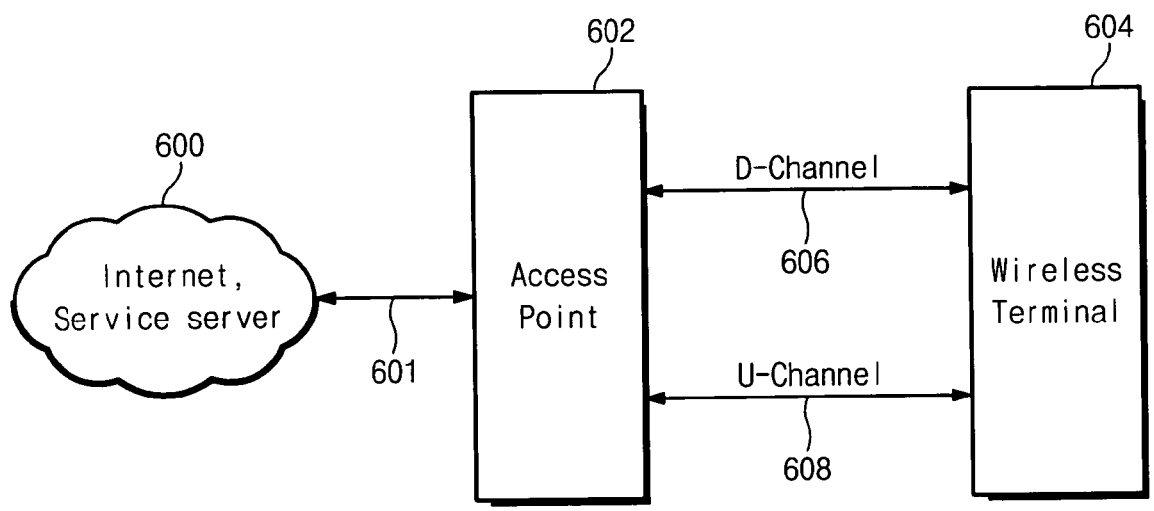
FIG. 6 is a block diagram depicting a wireless communication system for transmitting and receiving data using two separate wireless channels according to embodiments of the present invention.

FIG. 6 is a block diagram depicting a wireless communication system for transmitting and receiving data over two separate wireless channels according to embodiments of the present invention. As shown in FIG. 6, the wireless communication system includes an access point 602, a wireless terminal 604, a download channel 606 and an upload channel 608. The download channel 606 and the upload channel 608 are separate from each other, allowing for simultaneous data transmission and reception over both channels.

Figure 7:
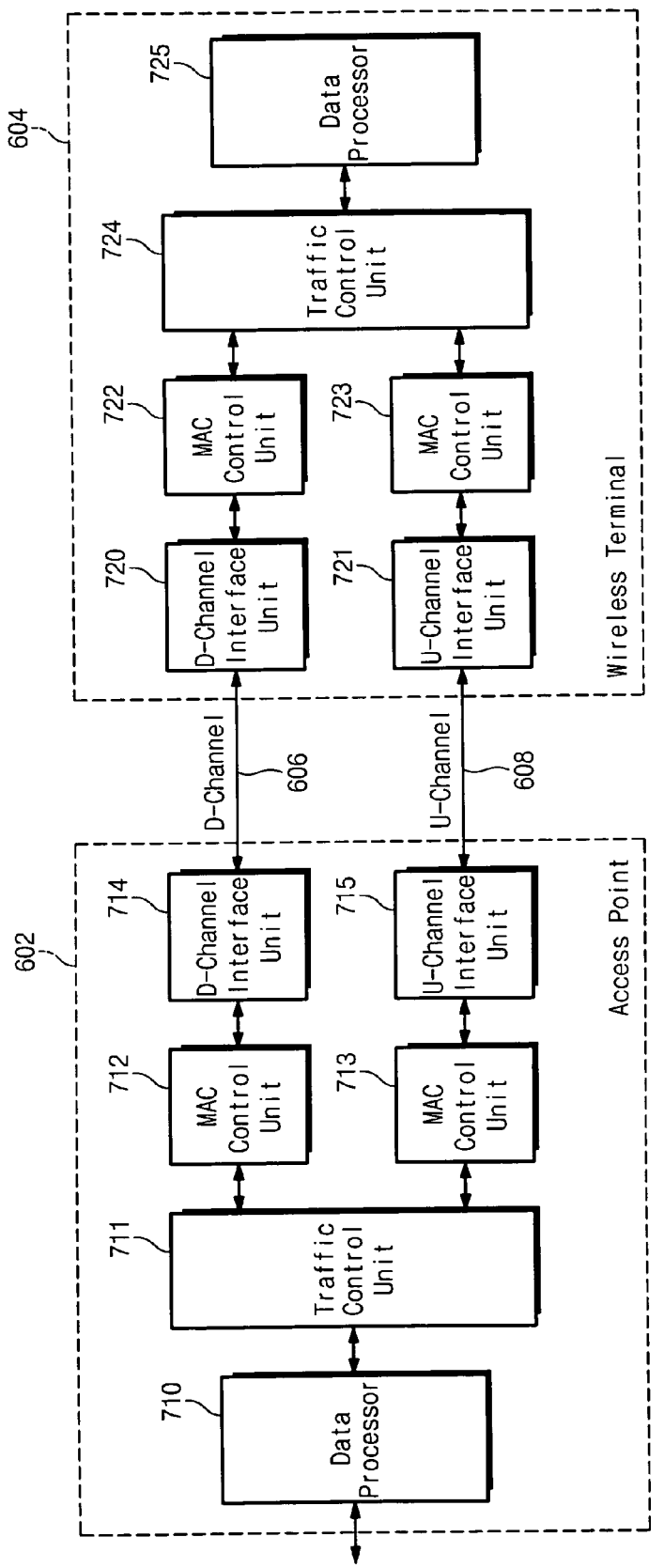
FIG. 7 is a block diagram of an access point and a wireless terminal that may be used in a wireless communication system of FIG. 6 according to embodiments of the present invention.

FIG. 7 is a block diagram of the access point 602 and the wireless terminal 604 used in the wireless communication system of FIG. 6. As shown in FIG. 7, the wireless terminal 604 includes a data processor 725 that performs protocols (RSVP, TCP/IP, etc.) used in the execution of applications and/or in the transmission and reception of application data. The wireless terminal 604 further includes a traffic control unit 724 that forms a data transmission route for each of the applications and that controls the transmission and reception of data therefore. The wireless terminal 604 further includes MAC control units 722 and 723 that check the channel state for each of the wireless channels 606 and 608 and control channel occupation. Finally, the wireless terminal 604 includes a download channel interface unit 720 for transmitting and receiving data through an interface with the download channel 606, and a upload channel interface unit 721 for transmitting and receiving data through an interface with the upload channel 608. The download channel interface unit 720 and the upload channel interface unit 721 may each include a transmitter and a receiver for data transmission and reception.

As is also shown in FIG. 7, the access point 602 includes a data processor 710 and a traffic control unit 711. The data processor 710 interfaces with one or more external processing servers 600. The data processor 710, for example, may forward data from the external processing server(s) 600 to the wireless terminal 604 and/or transmit data received from the wireless terminal to the external processing server(s) 600. The traffic control unit 724 may form a data transmission route for each of the applications and may control the transmission and reception of data therefore.

The access point 602 may further include MAC control units 712, 713 that check the channel state for each of the wireless channels 606 and 608 and control channel operation. Finally, the access point 602 includes a download channel interface unit 714 for transmitting and/or receiving data through an interface with download channel 606, and an upload channel interface unit 715 for transmitting and receiving data through an interface with the upload channel 608. The download channel interface unit 714 and the upload channel interface unit 715 may each include a transmitter and a receiver for data transmission and reception.

Figure 8:
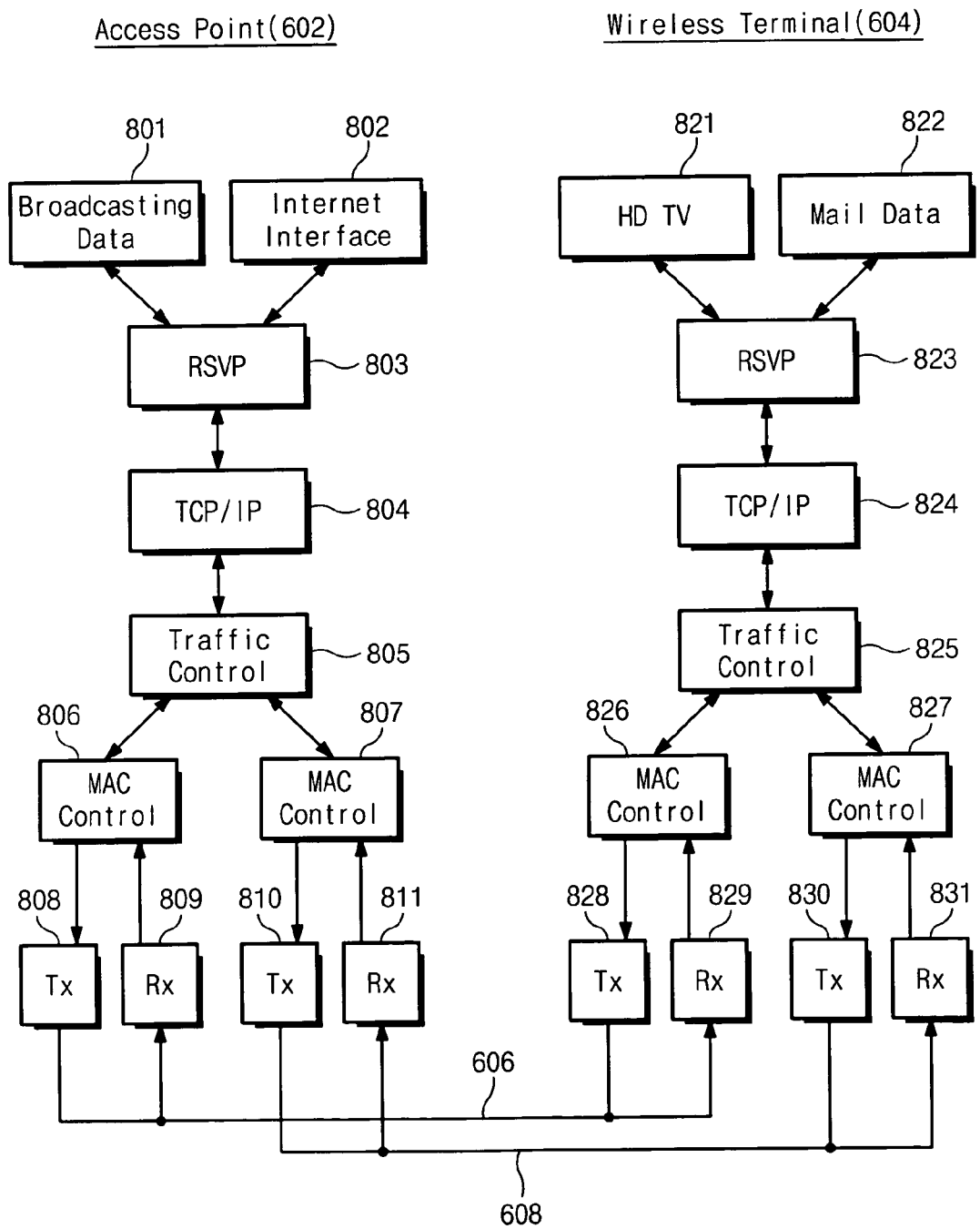
FIG. 8 is a flow chart illustrating a procedure for data transmission and reception between the access point and the wireless terminal of FIG. 7.

FIG. 8 is a flowchart illustrating a procedure for data transmission and reception between the access point 602 and the wireless terminal 604 of FIG. 7. In the example of FIG. 8, the data flow is depicted for the case in which the user of the wireless terminal 604 watches HD-TV while transmitting an e-mail through the Internet.

As shown in FIGS. 7 and 8, broadcasting data 801 received from the broadcasting server is transmitted to the traffic control unit 711 through the data processor 710 of the access point 602. The traffic control unit 711 forms a route (block 805 of FIG. 8) for transmission of the broadcasting data 801. The broadcasting data 801 is transmitted (see block 808 of FIG. 8) through the MAC control unit 712 and the download channel interface unit 714 over the download channel 606. The MAC control unit 712 checks the state of the download channel 606 through the download channel interface unit 714, and if the download channel 606 is in an idle state, the download channel 606 is occupied and used to transmit the broadcasting data 801 to the wireless terminal 604. If the channel is in a busy state, transmission is delayed until the channel returns to an idle state.

The broadcasting data 801 transmitted to the wireless terminal 604 from the access point 602 over the download channel 606 as described above is received through the download channel interface unit 720 of the wireless terminal 604. The data is then transmitted to the data processor 725 of the wireless terminal 604 via the MAC control unit 722 and the traffic control unit 724. The data processor 725 uses the received broadcasting data 801 so as to perform the application such as the HD-TV 821. The data processor 725 may also transmit (see block 828 of FIG. 8) to the access point 602 a response signal to the received broadcasting data 801 using the same route. Alternatively, broadcasting control signals may also be transmitted to the access point 602 using the upload channel 608, which might, for example, be used to transmit a volume control signal, a broadcasting channel retrieval signal or other signals that do not necessarily require a high throughput connection.

If the user of the wireless terminal 604 executes the mail data application 822 or another application that can be transmitted on a lower throughput connection, the data associated with the application may be switched (see block 825 of FIG. 8) via the data processor 725 and the traffic control until 724 of the wireless terminal 604 through the MAC control unit 723 and the upload channel interface unit 721 to the upload channel 608. To accomplish this, the MAC control unit 723 may check the state of the upload channel 608 through the upload channel interface unit 721. If the upload channel 608 is in the idle state, the channel 608 is occupied to transmit the mail data 822 to the access point 602 over the upload channel 608.

The mail data 822 transmitted from the wireless terminal 604 to the access point 602 over the upload channel 608 as described above is received (see block 811 of FIG. 8) through the upload channel interface unit 715 of the access point 602, and then is transmitted to the data processor 710 of the access point 602 via the MAC control unit 713 and the traffic control unit 711. The data processor 710 of the access point 602 may transmit the received mail data 822 to a mail server through an Internet interface 802.

Figure 9A:
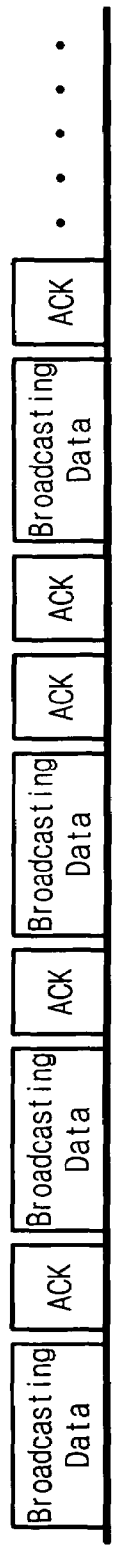
FIGS. 9A and 9B depict frames of data that may be transmitted and received by each respective wireless channel in the procedure of FIG. 8.
Figure 9B:
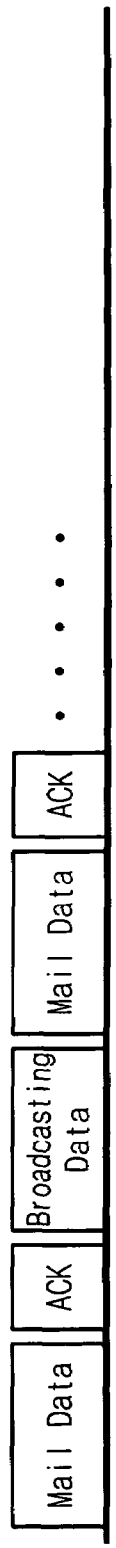

FIGS. 9A and 9B depict frames of data that may be transmitted and received by each of the respective wireless channels in the procedure of FIG. 8. FIG. 9A depicts a frame of data that may be transmitted and received through the download channel 606 in the embodiment of FIGS. 7 and 8. FIG. 9B depicts a frame of data that may be transmitted and received through the upload channel 608 in the embodiment of FIGS. 7 and 8.

As shown in FIGS. 9A and 9B, the broadcasting data is consecutively transmitted and received over the download channel 606, while the mail data is consecutively transmitted and received over the upload channel 608. Since the download channel 606 and the upload channel 608 are separate channels that operate independently, the data can be transmitted simultaneously. Accordingly, a much higher QoS of transmission data may be secured as compared to the case where a single channel is used.

In embodiments of the present invention, the download channel 606 and the upload channel 608 may use different communication protocols. For example, the download channel 606 which is used to transmit and receive high data rate data such as the broadcasting data may comprise an IEEE 802.11 a/g orthogonal frequency division multiplexing channel, while the upload channel 608 that is used to transmit and receive lower data rate data such as the mail data may use an IEEE 802.11b direct sequence spread spectrum channel.

Figure 10:
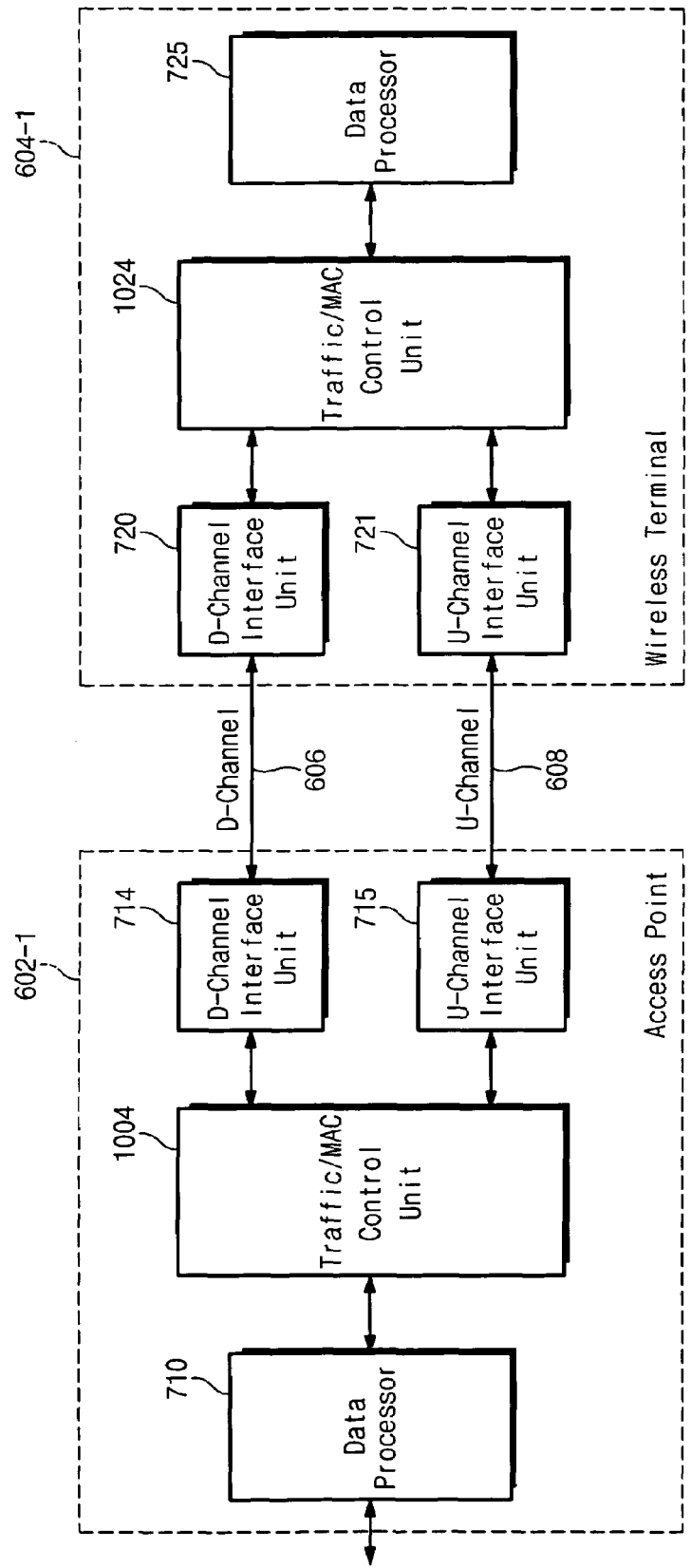
FIG. 10 is a block diagram illustrating an access point and a wireless channel according to further embodiments of the present invention.
Figure 11:
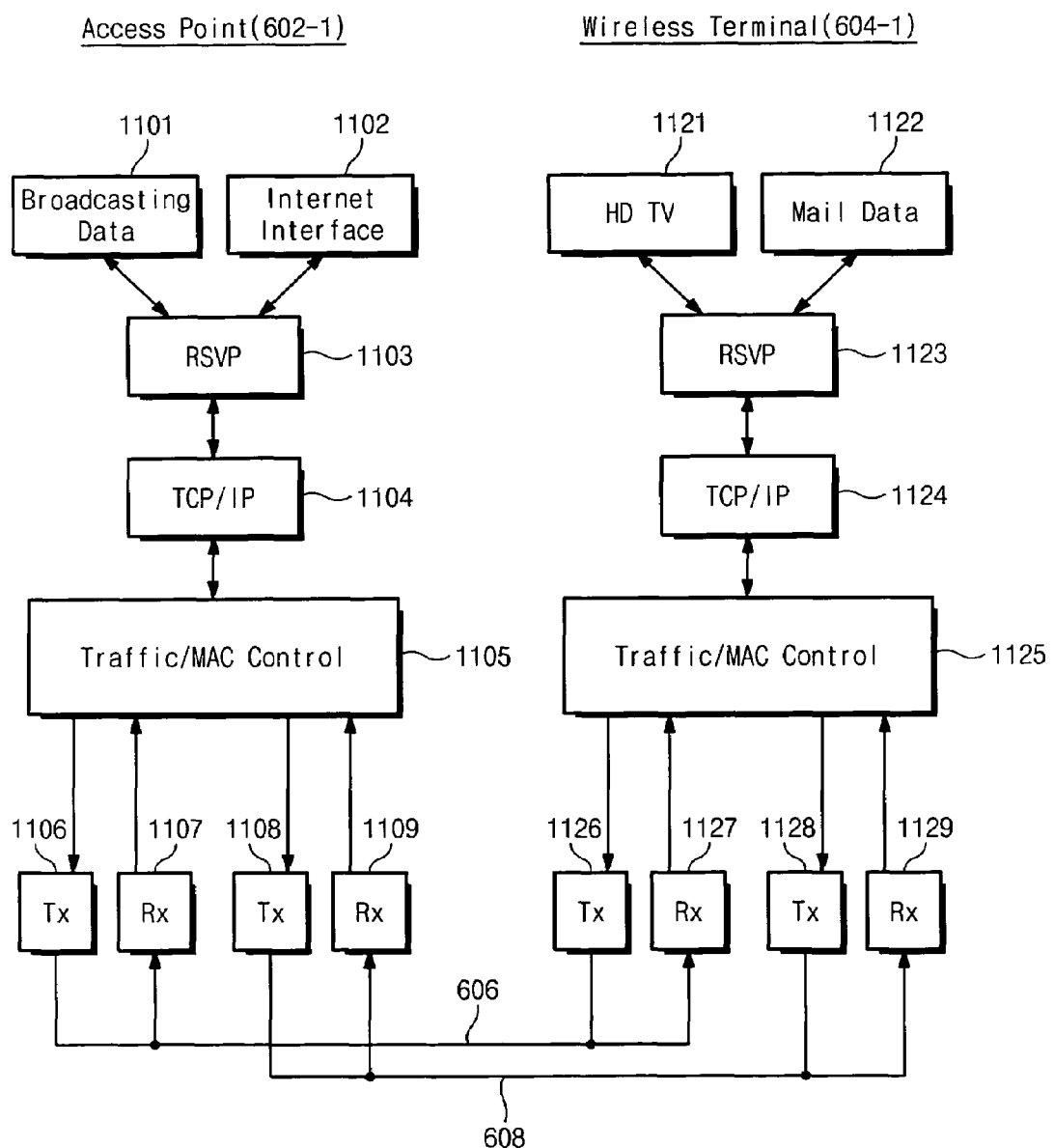
FIG. 11 is a flow chart illustrating a procedure for data transmission and reception between the access point and the wireless terminal of FIG. 10.

FIG. 10 illustrates an access point 602-1 and a wireless terminal 604-1 according to further embodiments of the present invention in which the traffic control unit and the MAC control units are implemented as a single unit. FIG. 11 illustrates a procedure for data transmission and reception between the access point and the wireless terminal of FIG. 10.

As shown in FIGS. 10 and 11, the operation and data flow of the embodiments of the present invention depicted in FIGS. 10 and 11 is the same as the operation and data flow of the embodiments of FIGS. 7 and 8, while the access point 602-1 and the wireless terminal 604-1 have simpler structure in light of the use of combined traffic/MAC control units 1004 and 1024.

Figure 12:
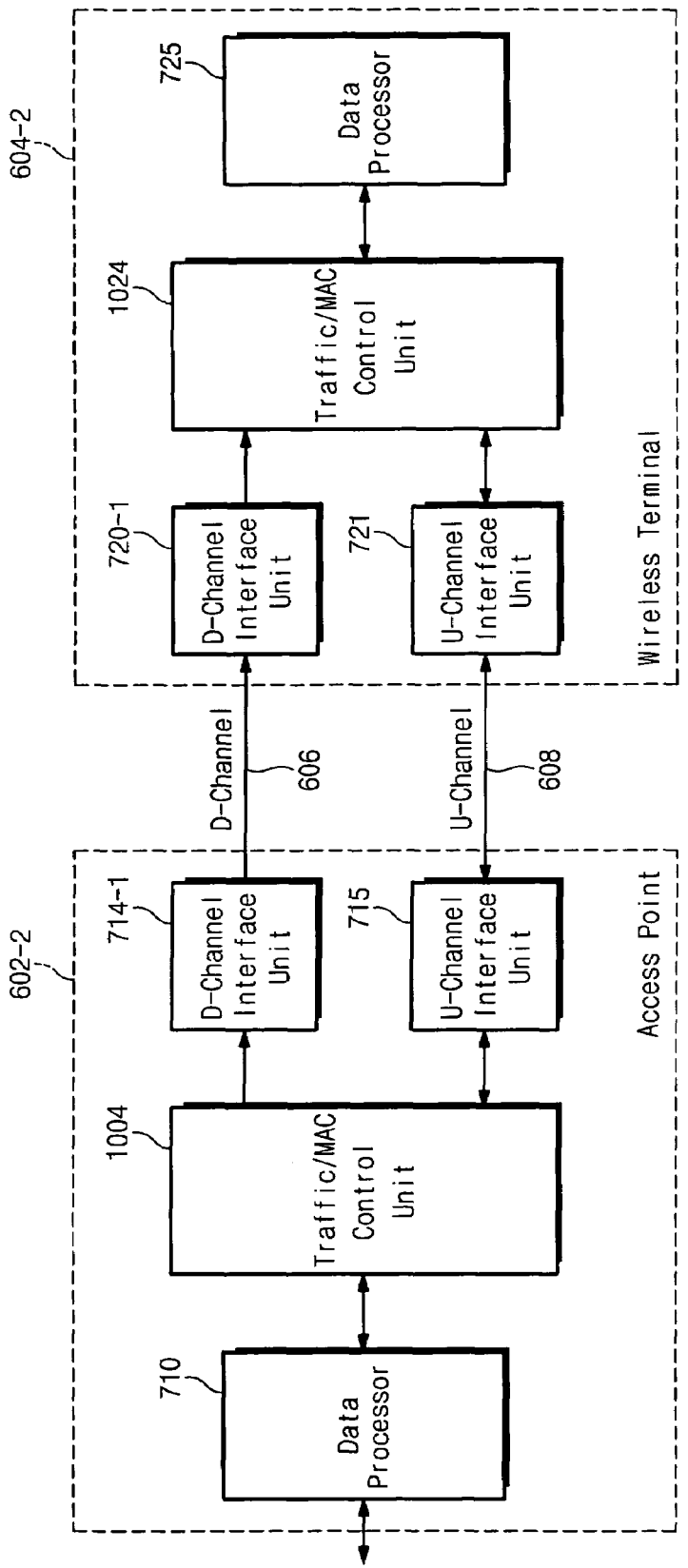
FIG. 12 is a block diagram illustrating a wireless communications system according to still further embodiments of the present invention.
Figure 13:
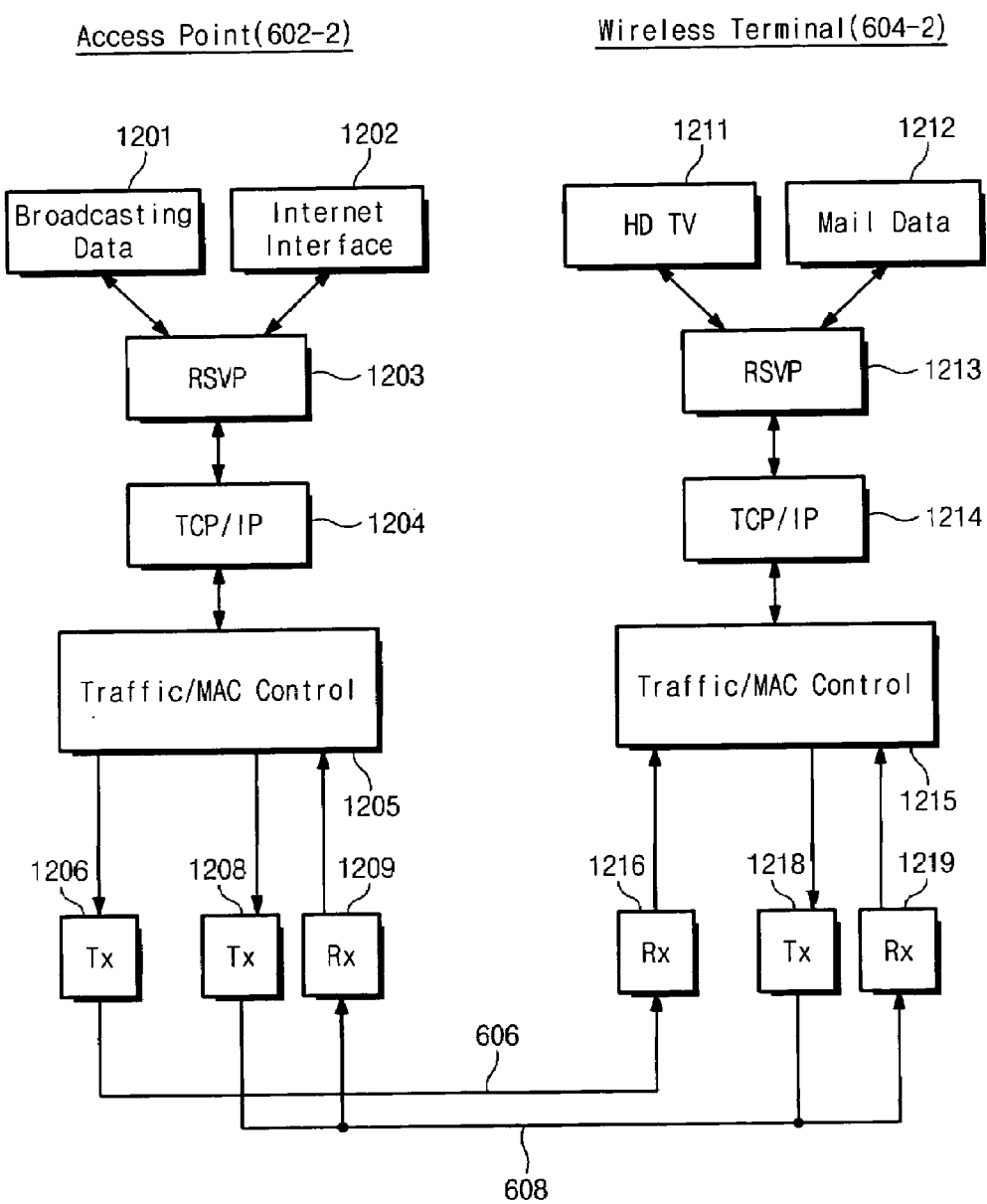
FIG. 13 is a flow chart illustrating a procedure for data transmission and reception between access point and the wireless terminal of FIG. 12.

FIG. 12 is a block diagram illustrating a system according to embodiments of the present invention in which the download channel 606 only supports communications from the access point to the wireless terminal. FIG. 13 is a flowchart that illustrates a procedure for data transmission and reception between the access point and the wireless terminal in the embodiment of FIG. 12.

In the wireless communication system as shown in FIG. 12, the download channel 606 only supports communications from the access point 602-2 to the wireless terminal 604-2. Since the download channel interface unit 714-1 of the access point 602-2 performs only the transmission function, it can be embodied as a stand-alone transmitter. Likewise, since the download channel interface unit 720-1 of the wireless terminal 604-2 performs only the reception function, it can be embodied only as a stand-alone receiver. In the embodiments of the present invention depicted in FIGS. 12 and 13, the response signal to the received broadcasting data and the broadcasting control signals may be transmitted over the upload channel 608.

The system operation in the embodiment of FIG. 12 is similar to operation of the system depicted in FIG. 7, but the traffic/MAC control units 1004 and 1024 operate in a different fashion. Referring to FIGS. 12 and 13, the traffic/MAC control unit 1024 of the wireless terminal 604-2 controls the transmission and reception of the mail data over the upload channel 608. The traffic/MAC control unit 1024 loads up received data on the TCP/IP block 1214 of the data processor 725 and loads down data to be transmitted to the upload channel interface unit 721. The broadcasting data received over the download channel is also loaded-up on the TCP/IP block 1214, and the response signal thereto and/or the broadcasting control signals are transmitted to the access point 602-2 through the upload channel interface unit 721.

The operation of the access point 602-2 is the same as in the above-described wireless terminal 604-2 except that only the transmission 1206 (and not reception) is enabled in the download channel interface unit 714-1.

Figure 14A:
FIGS. 14A and 14B depict frames of data that may be transmitted and received by each respective wireless channel in the procedure of FIG. 13.
Figure 14B:
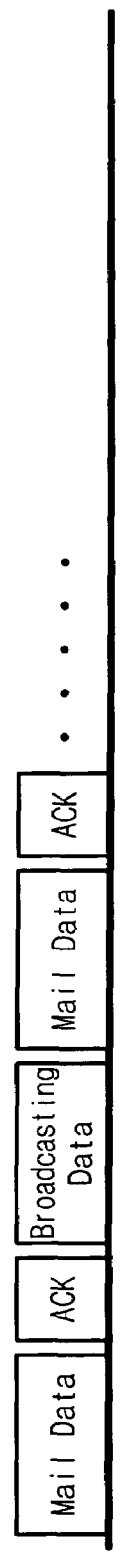

FIG. 14A depicts a frame of data that may be transmitted from the access point 602-2 to the wireless terminal 604-2 over the download channel 606 in the embodiment of FIG. 12. FIG. 14B depicts a frame of data that may be transmitted and received between the access point 602-2 and the wireless terminal 604-2 over the upload channel 608. As shown in FIG. 14A, only the broadcasting data is transmitted over the download channel 606. The transmission and reception of the mail data, the response signals (ACK) and the broadcasting control signals is performed over the upload channel 608.

While this invention has been particularly shown and described with reference to preferred embodiments thereof, it will be understood by those skilled in the art that various changes in form and details may be made therein without departing from the spirit and scope of the invention as defined by the appended claims and equivalents.

What is claimed is:

1. A wireless terminal configured to communicate over a wireless local area network, comprising:
   a data processor;
   at least one control unit that is responsive to the data processor and that controls communications with an access point over a first communications channel and over a second full-duplex communications channel;
   a first interface between the at least one control unit and the first communications channel; and
   a second interface between the at least one control unit and the second communications channel;
   wherein the at least one control unit comprises a MAC control unit; and
   wherein data associated with a first application running on the wireless terminal is transmitted to the wireless terminal over the first communications channel, and wherein at least some of control signals associated with the first application are transmitted from the wireless terminal to the access point over the second communications channel.

2. The wireless terminal of claim 1, further comprising a traffic control unit that is responsive to the data processor.

3. The wireless terminal of claim 2, wherein the at least one MAC control unit comprises a first MAC control unit for controlling communications with the access point over the first communications channel and a second MAC control unit for controlling communications with the access point over the second communications channel.

4. The wireless terminal of claim 1, wherein the at least one MAC control unit also includes a traffic control unit that forms a data transmission route for each of a plurality of applications running on the wireless terminal.

5. The wireless terminal of claim 1, wherein the first channel comprises a half-duplex channel that only carries data from the access point to the wireless terminal.

6. The wireless terminal of claim 5, wherein data associated with a multi-media application is transmitted over the first channel.

7. The wireless terminal of claim 1, wherein the first communications channel is implemented as an orthogonal frequency division multiplexing channel and wherein the second communications channel is implemented as a direct sequence spread spectrum communications channel.

8. The wireless terminal of claim 1, wherein the wireless local area network operates at least in part under the IEEE 802.11 standard.

9. The wireless terminal of claim 1, wherein the first communications channel and the second communications channel are implemented in different frequency bands.

10. The wireless terminal of claim 1, wherein the first and second communications channel are implemented using different multiple access techniques.

11. The wireless terminal of claim 1, wherein the first communications channel and the second communications channel are implemented according to different versions of the 802.11 standard.

12. A wireless communications system, comprising:
   a wireless terminal that transmits and receives data associated with at least first and second applications that are running on the wireless terminal;
   an access point that serves as an interface between the wireless terminal and at least one processing server that is located on at least one external network;
   a first communications channel between the wireless terminal and the access point for transmitting data associated with the first application from the access point to the wireless terminal; and
   a second communications channel between the wireless terminal and the access point for transmitting data associated with the second application between the wireless terminal and the access point.

13. The wireless communications system of claim 12, wherein the second communications channel is further used to transmit control information associated with the first application from the wireless terminal to the access point.

14. The wireless communications system of claim 12, wherein the first communications channel is further used to transmit control information associated with the first application from the wireless terminal to the access point.

15. The wireless communications system of claim 12, wherein the throughput of the first communications channel exceeds the throughput of the second communications channel.

16. The wireless communications system of claim 12, wherein the wireless terminal comprises:
   a data processor;
   at least one MAC control unit that is responsive to the data processor and that controls communications with the access point over the first communications channel and over the second communications channel;
   a first interface between the at least one MAC control unit and the first communications channel; and
   a second interface between the at least one MAC control unit and the second communications channel.

17. The wireless communications system of claim 16, wherein the access point comprises:
   a second data processor;
   at least one access point MAC control unit that is responsive to the second data processor and that controls communications with the wireless terminal over the first communications channel and over the second communications channel;
   a third interface between the at least one access point MAC control unit and the first communications channel; and
   a fourth interface between the at least one access point MAC control unit and the second communications channel.

18. The wireless communications system of claim 17, wherein the wireless terminal further comprises a first traffic control unit that is responsive to the data processor, and wherein the access point further comprises a second traffic control unit that is responsive to the second data processor.

19. The wireless communications system of claim 16, wherein the at least one MAC control unit comprises a first MAC control unit for controlling communications with the access point over the first communications channel and a second MAC control unit for controlling communications with the access point over the second communications channel, wherein the first interface is an interface between the first MAC control unit and the first communications channel and wherein the second interface is an interface between the second MAC control unit and the second communications channel.

20. The wireless communications system of claim 12, wherein the first channel comprises a uni-directional channel that only transmits data from the access point to the wireless terminal.

21. The wireless communications system of claim 12, wherein the first communications channel is implemented as an orthogonal frequency division multiplexing channel and wherein the second communications channel is implemented as a direct sequence spread spectrum communications channel.

22. The wireless communications system of claim 12, wherein at least some of the control signals associated with the first application are transmitted from the wireless terminal to the access point over the second communications channel.

23. The wireless communications system of claim 12, wherein the access point and the wireless terminal communicate at least in part under the IEEE 802.11 standard.

24. A method for supporting a plurality of applications on a wireless terminal, the method comprising:
   receiving at the wireless terminal over a first communications channel between the wireless terminal and an access point application data associated with a first of the plurality applications;
   establishing a transmission path between the wireless terminal and the access point over a second communications channel for application data associated with a second of the plurality of applications; and
   transmitting application data associated with the second of the plurality applications over the second communications channel via the transmission path;
   wherein the first and second communications channels are implemented using different multiple access techniques.

25. The method of claim 24, further comprising transmitting data associated with the first of the plurality applications over the second communications channel via the transmission path.

26. The method of claim 24, further comprising transmitting control data associated with the first of the plurality applications from the wireless terminal to the access point over the first communications channel.

27. The method of claim 24, wherein the first communications channel is implemented as an orthogonal frequency division multiplexing channel and wherein the second communications channel is implemented as a direct sequence spread spectrum communications channel.

28. The method of claim 24, wherein the first communications channel is a high throughput uni-directional communications channel.

29. The method of claim 24 wherein the wireless local area network operates at least in part under the IEEE 802.11 standard.

30. The method of claim 29, wherein the first application is a multi-media application.

31. A wireless communication system for transmitting and receiving data from a plurality of applications, comprising:
   a wireless terminal for transmitting and receiving data associated with a first of the plurality of applications and for running the first application;
   an access point interfaced with an external processing server, the access point transmitting data associated with a second application of the plurality of applications to the wireless terminal, and forwarding the data associated with the first application that is received from the wireless terminal to the external processing server; and
   a plurality of wireless channels for transmitting and receiving the data associated with the first and second applications between the wireless terminal and the access point;
   wherein the plurality of wireless channels operate in different frequency bands and have different throughputs;
   wherein the wireless terminal includes a data processor and at least one control unit that is responsive to the data processor and that controls communications with an access point over the plurality of wireless channels; and
   wherein the second application is remote from the wireless terminal.

32. The wireless communication system of claim 31, wherein the first wireless channel uses an orthogonal frequency division multiplexing multiple access protocol and the second wireless channel uses a direct sequence spread spectrum multiple access protocol.

33. The wireless communications system of claim 31, wherein the plurality of wireless channels include at least two channels that are implemented pursuant to different versions of the 802.11 standard.

34. The wireless terminal of claim 1, wherein the first communications channel is a full-duplex channel.

* * * * *